(12) United States Patent
Kim

(10) Patent No.: US 6,592,450 B1
(45) Date of Patent: Jul. 15, 2003

(54) ACCESS FLOOR USING SPECIAL TRANSFER PAPER

(76) Inventor: Jae-Won Kim, #7-1006 Woosung Apt., 1336 Seocho-2-dong, Seocho-gu, Seoul, 137-859 (KR)

( * ) Notice: Subject to any disclaimer, the term of this patent is extended or adjusted under 35 U.S.C. 154(b) by 0 days.

(21) Appl. No.: 10/188,529

(22) Filed: Jul. 3, 2002

(51) Int. Cl.[7] .................................................. B01L 1/04
(52) U.S. Cl. .................................... 454/187; 414/217.1
(58) Field of Search ....................... 454/187; 414/217.1, 414/935, 939, 940

(56) References Cited

U.S. PATENT DOCUMENTS

| 4,462,853 A | * | 7/1984 | Ringer ....................... 156/238 |
|---|---|---|---|
| 4,689,259 A | * | 8/1987 | Miller, Jr. et al. .......... 428/142 |
| 4,937,103 A | * | 6/1990 | Hess ........................... 427/269 |
| 5,031,525 A | * | 7/1991 | Kent et al. .................... 101/32 |
| 5,916,662 A | * | 6/1999 | Schmidt ...................... 428/141 |
| 6,332,941 B1 | * | 12/2001 | Council et al. ............. 156/230 |

* cited by examiner

Primary Examiner—Derek S. Boles
(74) Attorney, Agent, or Firm—Lee & Hong

(57) ABSTRACT

Disclosed is an access floor made using a special transfer paper which is laid on a floor of the interior of a clean room to prevent generation of dusts or bacteria in a factory of and integrated circuit such as a semiconductor, a laboratory for optics, genetic engineering and space engineering, a clinic room and so on, in which a conductive paint is coated on an upper surface of a plate and a special transfer paper with various patterns and colors are deposited and integrated on the conductive paint.

1 Claim, 2 Drawing Sheets

ACCESS FLOOR USING SPECIAL TRANSFER PAPER

BACKGROUND OF THE INVENTION

1. Field of the Invention

The present invention relates to an access floor needing high cleanness, flatness and durability, and more particularly to an access floor made using a special transfer paper which is laid on a floor of the interior of a clean room to prevent generation of dusts or bacteria in a factory of an integrated circuit such as a semiconductor, a laboratory for optics, genetic engineering and space engineering, a clinic room and so on.

2. Description of the Related Art

Generally, to make a factory of an integrated circuit such as a semiconductor or a laboratory for genetic engineering is generally conducted under the circumstance of a clean room which always keeps a clean state.

This clean room should be provided with a device for circulating clean air in the room by ventilating fresh air into the room and exhausting inner air, which can be contaminated by dusts or bacteria, outside to maintain the interior in a clean state.

To maintain good ventilation and internal cleanness, a floorboard facilitating ventilation of air is laid on the bottom. A conventional access floor has a structure that tiles with smooth surface are adhered by adhesive on an upper surface of rectangular plates and a plurality of ventilation holes are formed through the tiles and the plate by drilling for ventilation. This conventional floorboard uses adhesive such as bond glue, so toxic ingredients of the bone give effects on a semiconductor chip, resulting in decrease of production yield. These toxic ingredients may injure health of human when inhaled. In addition, when the circumferential temperature is high, the tiles get loose and shoved, while, when the temperature is low, the bond becomes hard and loses adhesive force, so the floorboard can be easily deformed or broken down. Therefore, durability of the tiles are weakened and conductivity is lowered. Moreover, since the tiles are adhered on the top of the plate of the access floor one by one, the work efficiency is decreased due to complexity of the work and the work costs increase. In addition, by using tiles, the interior cannot be decorated with various designs and colors.

SUMMARY OF THE INVENTION

Therefore, the present invention is designed to solve the problems of the prior art, and an object of the present invention is to provide an access floor using a special transfer paper which ensures excellent cleanness, superior flatness, long stable usage and beautiful appearance and requires shortened working hours.

In one aspect of the present invention, there is provided an access floor for a clean room, in which a conductive paint is coated on an upper surface of a plate which can be a die-casting perforated panel, a blind panel or a grating panel, and then a special transfer paper with various patterns and colors is deposited thereon.

BRIEF DESCRIPTION OF THE DRAWINGS

Other objects and aspects of the present invention will become apparent from the following description of embodiments with reference to the accompanying drawing in which.

DESCRIPTION OF THE PREFERRED EMBODIMENT

Figure 1:
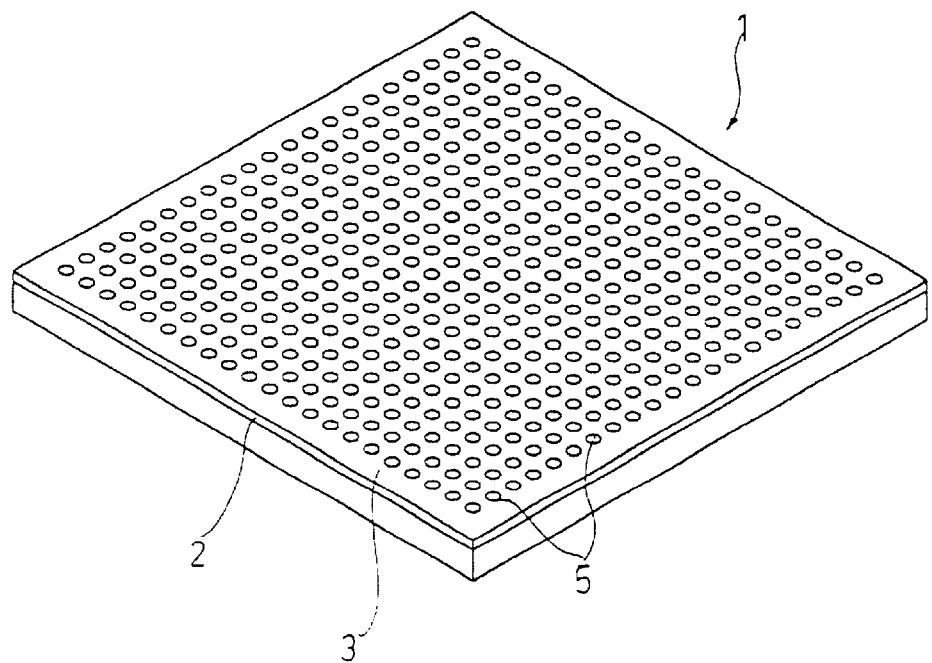
FIG. 1 is a perspective view showing a floor access using a special transfer paper according to the present invention.

Hereinafter, an access floor using a special transfer paper according to the present invention will be described in more detail referring to the drawings.

Figure 2:
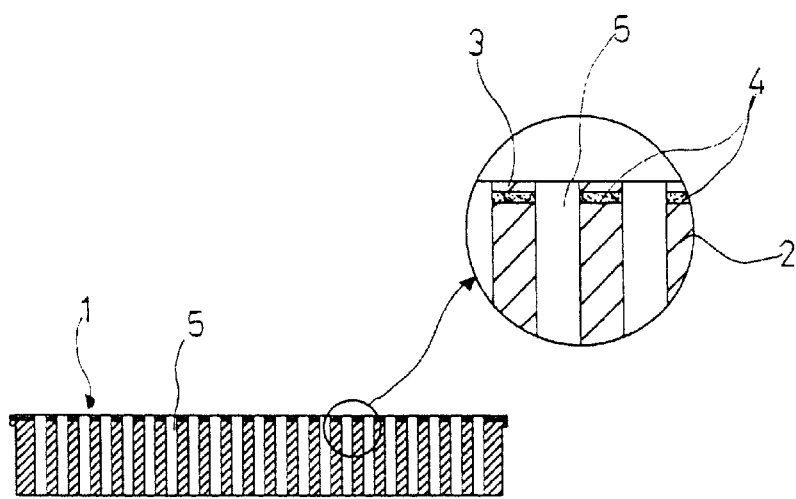
FIG. 2 is a sectional view showing the access floor using the special transfer paper according to the present invention.
Figure 3:
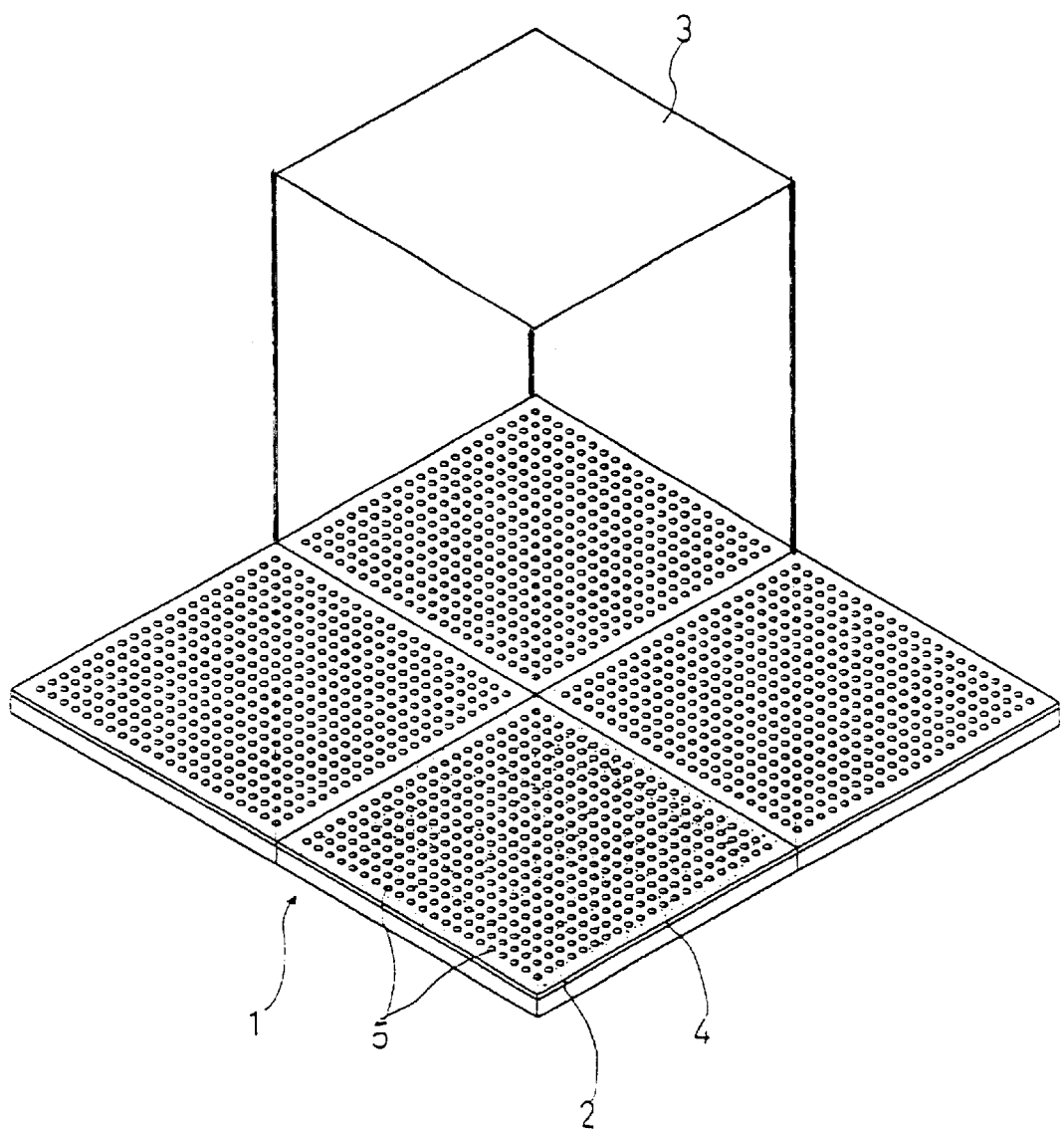
FIG. 3 is a perspective view showing the access floor using the special transfer paper in a used state according to the present invention.

FIG. 1 is a perspective view showing an access floor using a special transfer paper according to the present invention, FIG. 2 is a sectional view of the access floor, and FIG. 3 is a perspective view showing the access floor in a used state.

As shown in the figures, the access floor 1 of the present invention has a plate 2 of a rectangular shape. A conductive paint 4 is coated on an upper surface of the plate 2 so that minute dusts may be smoothly moved into ducts installed under the access floor 1. On the conductive paint 4, a special transfer paper with various patterns and colors is deposited by such as adhesion. If dried for about 30 minutes at 210° C. in a drying chamber, the transfer paper 3 is melted into the paint 4 to naturally form perforation 5 or grating patterns, thus the functional access floor is completed. This access floor has a structure which provide agreeable and clean circumstance by smooth suction and discharging of air through the lower ducts.

Applicability to the Industry

As described above, the access floor of the present invention sucks and removes dusts and fumes in a factory needing high precision such as semiconductor manufacturing, a clinic room or an automated office. Since the conductive paint and the special transfer paper are directly deposited, the access floor of the present invention can be manufactured more simply. In addition, the access floor of the present invention gives beautiful appearance owing to the special transfer paper with various patterns and colors and keeps durability continuously since it does not deform regardless of temperature change. Moreover, because of not using bond glue, the present invention lowers outguessing, so gives excellent effects of improved yield without harm to human body.

What is claimed is:

1. An access floor for laboratory and automated office, positioned on a floor of a clean room and having a plurality of exhaust holes for exhausting air containing dusts, wherein a conductive paint is coated on an upper surface of a plate and a special transfer paper with various patterns and colors are deposited and integrated on the conductive paint.

* * * * *